United States Patent
Koide et al.

(10) Patent No.: US 12,079,285 B2
(45) Date of Patent: Sep. 3, 2024

(54) TRAINING DEVICE, DETERMINATION DEVICE, TRAINING METHOD, DETERMINATION METHOD, TRAINING METHOD, AND DETERMINATION PROGRAM

(71) Applicant: NIPPON TELEGRAPH AND TELEPHONE CORPORATION, Tokyo (JP)

(72) Inventors: Takashi Koide, Musashino (JP); Daiki Chiba, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 62 days.

(21) Appl. No.: 17/612,567

(22) PCT Filed: May 24, 2019

(86) PCT No.: PCT/JP2019/020778
§ 371 (c)(1),
(2) Date: Nov. 19, 2021

(87) PCT Pub. No.: WO2020/240637
PCT Pub. Date: Dec. 3, 2020

(65) Prior Publication Data
US 2022/0237238 A1  Jul. 28, 2022

(51) Int. Cl.
*G06F 15/16* (2006.01)
*G06F 16/951* (2019.01)
(Continued)

(52) U.S. Cl.
CPC .......... *G06F 16/951* (2019.01); *G06F 16/986* (2019.01); *G06F 21/577* (2013.01); *G06F 2221/2119* (2013.01)

(58) Field of Classification Search
CPC .. G06F 16/951; G06F 16/953; G06F 16/9532; G06F 16/9538; G06F 16/986; G06F 2221/2119
See application file for complete search history.

(56) References Cited

U.S. PATENT DOCUMENTS 9,436,763 B1 * 9/2016 Gianos .................. G06F 16/958
11,003,773 B1 * 5/2021 Fang .................... H04L 63/0263
(Continued)

FOREIGN PATENT DOCUMENTS

EP  3407235 A1  11/2018
JP  2012-043285 A  3/2012

OTHER PUBLICATIONS

Siyue Zhang, Weiguang Wang, Zhao Chen, Heng Gu, J. Liu and Cong Wang, "A web page malicious script detection system," 2014 IEEE 3rd International Conference on Cloud Computing and Intelligence Systems, Shenzhen, 2014, pp. 394-399, doi: 10.1109/CCIS.2014.7175767. (Year: 2014).*

(Continued)

*Primary Examiner* — Alex Gofman
(74) *Attorney, Agent, or Firm* — XSENSUS LLP

(57) ABSTRACT

A learning device includes processing circuitry configured to use a web browser to crawl one or more web pages from an originating web page, and to accept input of log information obtained from the web browser until an ending web page is reached, and generate a training model using, as training data, any one or more feature amounts among a feature amount of each web page included in the log information, a feature amount about an operation performed on the web browser on a path reaching the ending web page, and a feature amount about an event occurring on the path reaching the ending web page.

12 Claims, 11 Drawing Sheets

(51) Int. Cl.
    *G06F 16/958*   (2019.01)
    *G06F 21/57*    (2013.01)

(56) References Cited

U.S. PATENT DOCUMENTS

| | | | | |
|---|---|---|---|---|
| 2013/0086636 | A1* | 4/2013 | Golovanov | G06F 21/56 |
| | | | | 726/3 |
| 2018/0351968 | A1* | 12/2018 | MacLeod | H04L 63/0236 |
| 2019/0171816 | A1* | 6/2019 | Copty | G06N 20/00 |

OTHER PUBLICATIONS

Kharraz et al., "Surveylance: Automatically Detecting Online Survey Scams", IEEE Symposium on Security and Privacy, May 2018, pp. 70-86.

Srinivasan et al., "Exposing Search and Advertisement Abuse Tactics and Infrastructure of Technical Support Scammers", Proceedings of the World Wide Web Conference on World Wide Web—WWW, https://doi.org/10.1145/3178876.3186098, Apr. 23-27, 2018, 10 pages.

Yagi et al., "Information Obtained by Patrolling with Thug", Practical Cybersecurity Monitoring, 2016, pp. 68-70.

Koide et al., "Automatically Collecting User-initiated Web-based Attacks" IPSJ SIG Technical Report, Feb. 28, 2018, 9 pages (including English Abstract).

International Search Report and Written Opinion mailed on Aug. 13, 2019, received for PCT Application PCT/JP2019/020778, Filed on May 24, 2019, 8 pages including English Translation.

Marco Cova et al., "Detection and Analysis of Drive-by-Download Attacks and Malicious JavaScript Code", 2010, Proceedings of the 19th International Conference on World Wide Web WWW 2010, pp. 281-290, Apr. 26-30, Raleigh, NC, USA, total 10 pages.

Gianluca Stringhini et al., "Shady Paths: Leveraging Surfing Crowds to Detect Malicious Web Pages", Computer & Communications Security 2013, Nov. 4-8, 2013, pp. 133-144, total 12 pages.

Doyen Sahoo et al., "Malicious URL Detection using Machine Learning: A Survey", vol. 1, No. 1, Article Publication date: Aug. 2019, total 37 pages.

\* cited by examiner

Fig. 5

| S/N | ITEM |
|---|---|
| 1 | SCREEN SHOT IMAGE OF WEB PAGE 1 |
| 2 | SCREEN SHOT IMAGE OF WEB PAGE 2 |
| 3 | SCREEN SHOT IMAGE OF WEB PAGE 3 |
| 4 | HTML SOURCE CODE OF WEB PAGE 1 |
| 5 | HTML SOURCE CODE OF WEB PAGE 2 |
| 6 | HTML SOURCE CODE OF WEB PAGE 3 |
| 7 | COMMUNICATION LOG BETWEEN WEB PAGES 1 AND 2 |
| 8 | COMMUNICATION LOG BETWEEN WEB PAGES 2 AND 3 |
| 9 | BROWSER OPERATION LOG BETWEEN WEB PAGES 1 AND 2 |
| 10 | BROWSER OPERATION LOG BETWEEN WEB PAGES 2 AND 3 |
| 11 | BROWSER EVENT LOG BETWEEN WEB PAGES 1 AND 2 |
| 12 | BROWSER EVENT LOG BETWEEN WEB PAGES 2 AND 3 |

Fig. 6

| S/N | ITEM | CONTENT |
|---|---|---|
| 1 | THE NUMBER OF OCCURRENCES OF WEB PAGE REDIRECT | 2 |
| 2 | COMMUNICATION DESTINATION OF WEB PAGE REDIRECT | http://redirect1.example.com, http://redirect2.example.com |
| 2 | COMMUNICATION DESTINATION OF WEB PAGE | http://page.example.com |

Fig. 7

| S/N | ITEM | CONTENT |
|---|---|---|
| 1 | MOUSE LEFT BUTTON CLICK | AFFIRMATIVE |
| 2 | MOUSE RIGHT BUTTON CLICK | NEGATIVE |
| 3 | BACK BUTTON CLICK | NEGATIVE |
| 4 | X COORDINATE OF MOUSE WHEN CLICKED | 100 |
| 5 | Y COORDINATE OF MOUSE WHEN CLICKED | 200 |
| 6 | CLICK TARGET HTML ELEMENT HEIGHT | 50 |
| 7 | CLICK TARGET HTML ELEMENT WIDTH | 300 |
| 8 | CLICK TARGET HTML ELEMENT TAG TYPE | a |

Fig. 8

| S/N | ITEM | CONTENT |
|---|---|---|
| 1 | FILE DOWNLOAD OCCURRENCE | AFFIRMATIVE |
| 2 | FILE DOWNLOAD DESTINATION URL | http://example.com/test.exe |
| 3 | ALERT DIALOG APPEARANCE | AFFIRMATIVE |
| 4 | ALERT DIALOG MESSAGE | "Your system is infected." |
| 5 | BROWSER EXTENSION FUNCTION INSTALLATION SCREEN APPEARANCE | AFFIRMATIVE |
| 6 | BROWSER EXTENSION FUNCTION INSTALLATION DESTINATION URL | http://store.example.com/abcdefg |
| 7 | POP UP WINDOW APPEARANCE | AFFIRMATIVE |
| 8 | POP UP WINDOW DESTINATION URL | http://example.com/pop.html |

Fig. 9

| S/N | ITEM | THE NUMBER OF DATA ITEMS |
|---|---|---|
| 1 | IMAGE COLOR HISTOGRAM (RED) | 256-DIMENSIONAL |
| 2 | IMAGE COLOR HISTOGRAM (GREEN) | 256-DIMENSIONAL |
| 3 | IMAGE COLOR HISTOGRAM (BLUE) | 256-DIMENSIONAL |
| 2 | IMAGE LOCAL FEATURE AMOUNT | 128-DIMENSIONAL |

Fig. 10

| S/N | ITEM | THE NUMBER OF DATA ITEMS |
|---|---|---|
| 1 | DOC2VEC FEATURE AMOUNT | 300-DIMENSIONAL |
| 2 | LDA FEATURE AMOUNT | 20-DIMENSIONAL |
| 3 | BAG-OF-WORDS FEATURE AMOUNT | 100-DIMENSIONAL |
| 4 | TF-IDF FEATURE AMOUNT | 100-DIMENSIONAL |
| 5 | THE NUMBER OF CHARACTERS OF DOCUMENT DATA | ONE-DIMENSIONAL |

Fig. 11

| S/N | ITEM | THE NUMBER OF DATA ITEMS |
|---|---|---|
| 1 | THE NUMBER OF HTML TAG APPEARANCES | 40-DIMENSIONAL |
| 2 | HTML SOURCE CODE DATA SIZE | 1 |

Fig. 12

| S/N | ITEM | THE NUMBER OF DATA ITEMS | DATA EXAMPLE |
|---|---|---|---|
| 1 | MOUSE LEFT BUTTON CLICK | ONE-DIMENSIONAL | 1 |
| 2 | MOUSE RIGHT BUTTON CLICK | ONE-DIMENSIONAL | 0 |
| 3 | BACK BUTTON CLICK | ONE-DIMENSIONAL | 0 |
| 4 | X COORDINATE OF MOUSE WHEN CLICKED | ONE-DIMENSIONAL | 100 |
| 5 | Y COORDINATE OF MOUSE WHEN CLICKED | ONE-DIMENSIONAL | 200 |
| 6 | CLICK TARGET HTML ELEMENT HEIGHT | ONE-DIMENSIONAL | 50 |
| 7 | CLICK TARGET HTML ELEMENT WIDTH | ONE-DIMENSIONAL | 300 |
| 8 | CLICK TARGET HTML ELEMENT TAG TYPE IS "a" TAG | ONE-DIMENSIONAL | 1 |
| 9 | CLICK TARGET HTML ELEMENT TAG TYPE IS "div" TAG | ONE-DIMENSIONAL | 0 |
| 10 | CLICK TARGET HTML ELEMENT TAG TYPE IS "iframe" TAG | ONE-DIMENSIONAL | 0 |

Fig. 13

| S/N | ITEM | THE NUMBER OF DATA ITEMS | DATA EXAMPLE |
|---|---|---|---|
| 1 | THE NUMBER OF FILE DOWNLOAD OCCURRENCES | ONE-DIMENSIONAL | 2 |
| 2 | THE NUMBER OF ALERT DIALOG APPEARANCES | ONE-DIMENSIONAL | 1 |
| 3 | THE NUMBER OF BROWSER EXTENSION FUNCTION INSTALLATION SCREEN APPEARANCES | ONE-DIMENSIONAL | 0 |
| 4 | THE NUMBER OF POP UP WINDOW APPEARANCES | ONE-DIMENSIONAL | 1 |
| 5 | THE NUMBER OF REDIRECT OCCURRENCES | ONE-DIMENSIONAL | 2 |

Fig. 14

| S/N | ITEM |
|---|---|
| 1 | IMAGE FEATURE AMOUNT OF WEB PAGE 1 |
| 2 | IMAGE FEATURE AMOUNT OF WEB PAGE 2 |
| 3 | IMAGE FEATURE AMOUNT OF WEB PAGE 3 |
| 4 | DOCUMENT FEATURE AMOUNT OF WEB PAGE 1 |
| 5 | DOCUMENT FEATURE AMOUNT OF WEB PAGE 2 |
| 6 | DOCUMENT FEATURE AMOUNT OF WEB PAGE 3 |
| 7 | STRUCTURAL FEATURE AMOUNT OF WEB PAGE 1 |
| 8 | STRUCTURAL FEATURE AMOUNT OF WEB PAGE 2 |
| 9 | STRUCTURAL FEATURE AMOUNT OF WEB PAGE 3 |
| 10 | BROWSER OPERATION FEATURE AMOUNT BETWEEN WEB PAGES 1 AND 2 |
| 11 | BROWSER OPERATION FEATURE AMOUNT BETWEEN WEB PAGES 2 AND 3 |
| 12 | BROWSER EVENT FEATURE AMOUNT BETWEEN WEB PAGES 1 AND 2 |
| 13 | BROWSER EVENT FEATURE AMOUNT BETWEEN WEB PAGES 2 AND 3 |

| S/N | DETERMINATION TARGET DATA | DETERMINATION RESULT |
|---|---|---|
| 1 | WEB PAGE A - WEB PAGE B - WEB PAGE C | MALICIOUS |
| 2 | WEB PAGE D - WEB PAGE E - WEB PAGE F | BENIGN |
| 3 | WEB PAGE G - WEB PAGE H - WEB PAGE I | MALICIOUS |
| 4 | WEB PAGE J - WEB PAGE K - WEB PAGE L | MALICIOUS |
| 5 | WEB PAGE M - WEB PAGE N - WEB PAGE O | BENIGN |

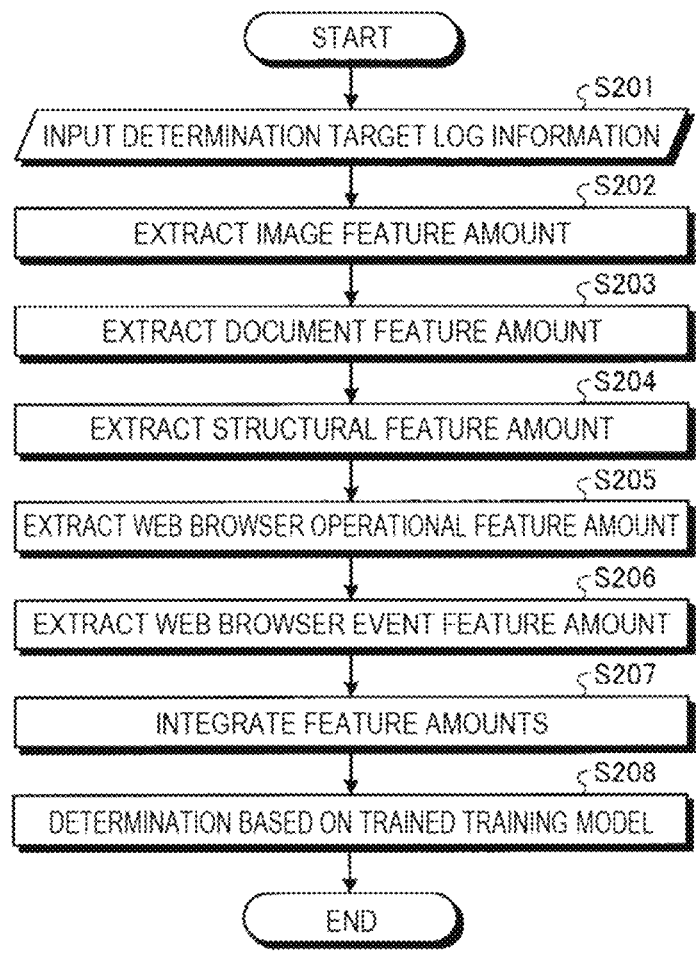

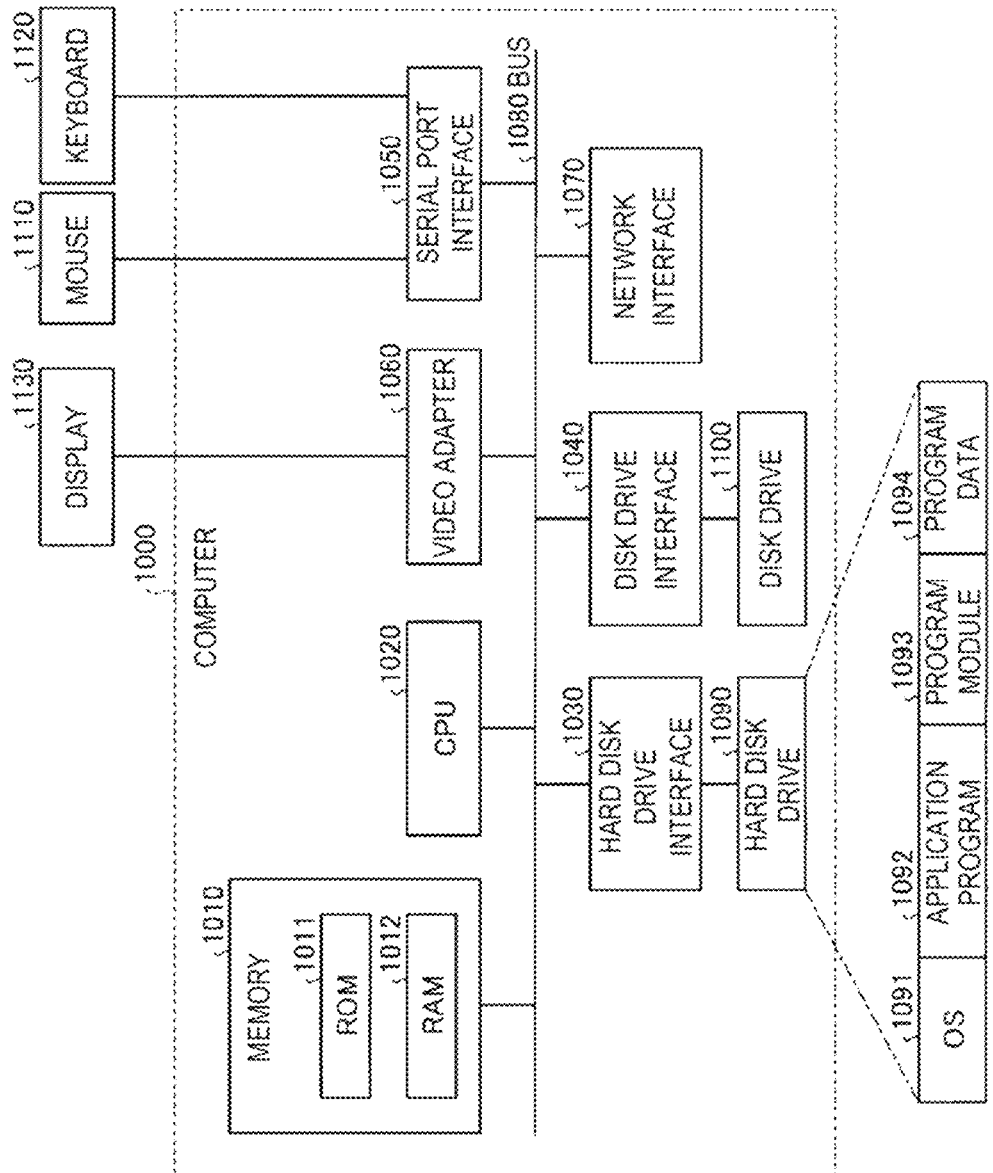

TRAINING DEVICE, DETERMINATION DEVICE, TRAINING METHOD, DETERMINATION METHOD, TRAINING METHOD, AND DETERMINATION PROGRAM

CROSS-REFERENCE TO RELATED APPLICATION

The present application is based on PCT filing PCT/JP2019/020778, filed May 24, 2019, the entire contents of which are incorporated herein by reference.

TECHNICAL FIELD

The present invention relates to a learning device, a determination device, a learning method, a determination method, a learning program, and a determination program.

BACKGROUND ART

Conventionally, cyber attackers prepare web pages for distributing malware, which is a collective term of malicious software, and for stealing personal information. On the web pages, drive-by download (DBD) attacks, which are attacks targeting vulnerabilities of web browsers or plug-ins, are performed. Social engineering (SE) attacks that psychologically lead accessing users to download malware or to input personal information, sometimes occur.

There is a method of using a web client type honeypot that is a decoy system including vulnerabilities in order to analyze web pages causing DBD attacks. The web client type honeypot accesses a web page, determines occurrence of a DBD attack, and sets communication destination information typified by the URL (Uniform Resource Locator), the domain name, and the IP address of the web page, in a blacklist. A security device typified by a firewall and an intrusion detection system prevents users' malware infection by blocking web accesses to the blacklist.

The SE attack provides users with false information typified by false malware infection or false prize winning, and psychologically leads them to access a web page, thereby succeeding in the attack. Methods of determining a web page causing an SE attack include a method that extracts visual information on a web page or information on an external communication request that the web page reads, and compares the information with information on web pages used for known SE attacks. There is a method of blocking users' web access with reference to communication destination information as a blacklist in case a web page is determined as one causing an SE attack, in a manner similar to that of the measures against DBD attacks.

Existing methods of determining SE attacks include, for example, a method of automatically operating a web browser to crawl web pages, extracting feature amounts from a single web page that is a determination target, and performing malicious determination (for example, Non-Patent Literatures 1 and 2). These methods are specialized in crawling and detecting that target technical support scams and survey scams, which are attack types encompassed by SE attacks. That is, crawling destinations are determined and attacks are detected, using features specific to each attack type.

CITATION LIST

Non-Patent Literature

Non-Patent Literature 1: A. Kharraz, W. Robertson, and E. Kirda, "Surveylance: Automatically Detecting Online Survey Scams," Proc.—IEEE Symp. Secur. Priv., vol. 2018-May, pp. 70-86, 2018.

Non-Patent Literature 2: B. Srinivasan, A. Kountouras, N. Miramirkhani, M. Alam, N. Nikiforakis, M. Antonakakis, and M. Ahamad, "Expo sing Search and Advertisement Abuse Tactics and Infrastructure of Technical Support Scammers," Proceedings of the 2018 World Wide Web Conference on World Wide Web—WWW '18, pp. 319-328, 2018.

SUMMARY OF THE INVENTION

Technical Problem

The existing method of determining SE attacks described above uses a web browser to crawl web pages, extracts a feature amount from a single web page that is a determination target, and performs malicious determination. Unfortunately, these methods have two problems. The first problem is in that since the existing method performs determination using features specific to a particular attack type that is a type of SE attacks, which include technical support scams and survey attacks, the determination target attack type is limited. The second problem is in that since the existing method uses only information extracted from a single web page that is a determination target without considering information on web pages accessed before the web page is reached and information specific to SE attacks, such as browser operations on the path and events occurring in the web browser, an erroneous detection sometimes occurs.

The present invention has been made in view of the above description, and has an object to use log information on the web page using the web browser to determine SE attacks that are not restricted by attack types, and further reduce erroneous detections.

Means for Solving the Problem

To solve the problem described above and achieve the object, a learning device according to the present invention includes: processing circuitry configured to: use a web browser to crawl one or more web pages from an originating web page, and to accept input of log information obtained from the web browser until an ending web page is reached; and generate a training model using, as training data, any one or more feature amounts among a feature amount of each web page included in the log information, a feature amount about an operation performed on the web browser on a path reaching the ending web page, and a feature amount about an event occurring on the path reaching the ending web page.

A determination device according to the present invention includes: processing circuitry configured to: use a web browser to crawl one or more web pages from an originating web page, and to accept input of log information obtained from the web browser until an ending web page is reached; and input any one or more feature amounts among a feature amount of each web page included in the log information, a feature amount about an operation performed on the web browser on a path reaching the ending web page, and a feature amount about an event occurring on the path reaching the ending web page, as input data, into a pre-trained training model, and determine whether the ending web page is malicious according to an output result of the training model.

Effects of the Invention

According to the present invention, according to the present invention, advantageous effects are exerted where log information obtained when web pages are crawled through use of a web page is used to allow a web page causing an SE attack to be accurately determined without limitation to individual attack types of SE attacks.

BRIEF DESCRIPTION OF DRAWINGS

FIG. 5 shows an example of a configuration of log information.

FIG. 6 shows an example of a configuration of a communication log that is a configuration element of the log information shown in FIG. 5.

FIG. 7 shows an example of a configuration of a web browser operation log that is a configuration element of the log information shown in FIG. 5.

FIG. 8 shows an example of a configuration of a web browser event log that is a configuration element of the log information shown in FIG. 5.

FIG. 9 shows an example of an image feature amount.

FIG. 10 shows an example of a document feature amount.

FIG. 11 shows an example of a structural feature amount.

FIG. 12 shows an example of a browser operation feature amount.

FIG. 13 shows an example of a browser event feature amount.

FIG. 14 shows an example of determination target data.

FIG. 17 shows a flowchart of a determination process.

FIG. 18 shows an example of a computer that executes a program to thereby achieve the learning device or the determination device.

DESCRIPTION OF EMBODIMENTS

Figure 1:
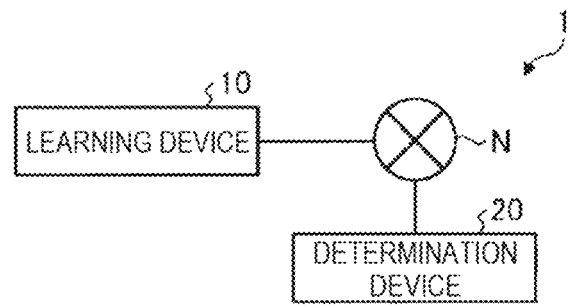
FIG. 1 shows an example of a configuration of a determination system according to an embodiment.

Hereinafter, referring to the drawings, an embodiment of the present invention is described in detail. Note that the present invention is not limited by this embodiment. In the illustration in the drawings, the same parts are indicated by being assigned the same symbols.

[Embodiment] The embodiment of the present invention is described. FIG. 1 shows an example of a configuration of a determination system according to the embodiment.

As shown in FIG. 1, the determination system 1 according to the embodiment includes a learning device 10, and a determination device 20. The learning device 10 and the determination device 20 are connected to each other via a network N. The learning device 10 and the determination device 20 may be connected to an external device (not shown) via the network N.

The learning device 10 generates a training model for determining whether a web page is malicious. Specifically, the learning device 10 uses a web browser to crawl one or more web pages from an originating web page, and to accept input of log information obtained from the Web browser until an ending web page is reached. The learning device 10 then generates a training model using, as training data, any one or more feature amounts among a feature amount of each web page included in the log information, a feature amount about an operation performed on the web browser on a path reaching the ending web page, and a feature amount about an event occurring on the path reaching the ending web page.

The determination device 20 receives the training model generated by the learning device 10, and determines whether the web page is malicious using the training model. Specifically, the determination device 20 uses a web browser to crawl one or more web pages from an originating web page, and to accept input of log information obtained from the web browser until an ending web page is reached. The determination device 20 then inputs any one or more feature amounts among a feature amount of each web page included in the log information, a feature amount about an operation performed on the web browser on a path reaching the ending web page, and a feature amount about an event occurring on the path reaching the ending web page, as input data, into a pre-trained training model, and determines whether the ending web page is malicious according to an output result of the training model.

Figure 2:
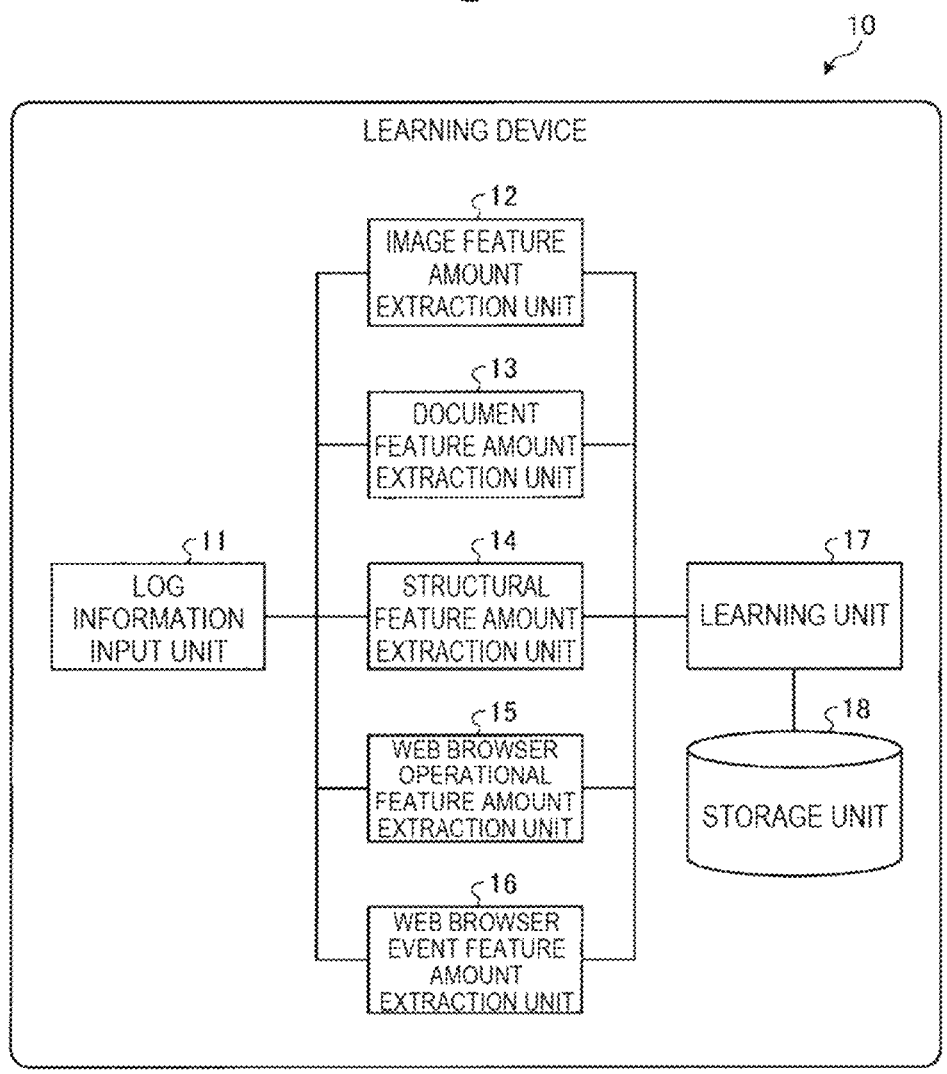
FIG. 2 shows an example of a configuration of a learning device shown in FIG. 1.

[Configurations of learning device and determination device] Next, the configuration of the learning device 10 is described. FIG. 2 shows an example of the configuration of the learning device 10 shown in FIG. 1. The learning device 10 shown in FIG. 2 is achieved such that a predetermined program is read by a computer or the like including a ROM (Read Only Memory), a RAM (Random Access Memory) and a CPU (Central Processing Unit), and the CPU executes the predetermined program. The learning device 10 may also include an NIC (Network Interface Card) or the like, and can communicate with another device via an electric communication line, such as a LAN (Local Area Network) or the Internet.

The learning device 10 includes a log information input unit 11, an image feature amount extraction unit 12, a document feature amount extraction unit 13, a structural feature amount extraction unit 14, a web browser operational feature amount extraction unit 15, a web browser event feature amount extraction unit 16, a learning unit 17, and a storage unit 18.

Figure 3:
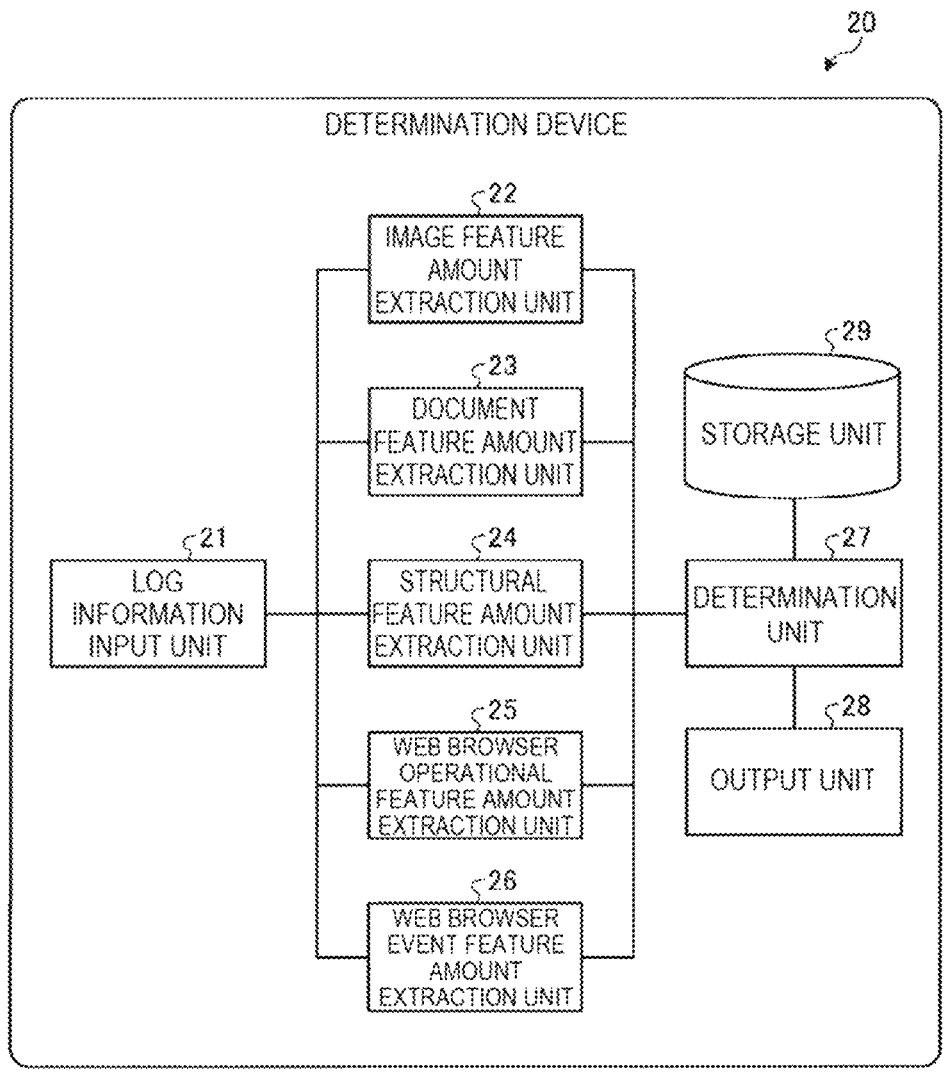
FIG. 3 shows an example of a configuration of a determination device shown in FIG. 1.

Next, the configuration of the determination device 20 is described. FIG. 3 shows an example of the configuration of the determination device 20 shown in FIG. 1. The determination device 20 shown in FIG. 3 is achieved such that a predetermined program is read by a computer or the like including a ROM a RAM and a CPU, and the CPU executes the predetermined program. The determination device 20 may also include an NIC or the like, and can communicate with another device via an electric communication line, such as a LAN or the Internet.

The determination device 20 includes a log information input unit 21, an image feature amount extraction unit 22, a document feature amount extraction unit 23, a structural feature amount extraction unit 24, a web browser operational feature amount extraction unit 25, a web browser event feature amount extraction unit 26, a determination unit 27, an output unit 28 and a storage unit 29.

Hereinafter, each unit of the learning device 10 is described. The log information input unit 11 uses a web browser to crawl one or more web pages from an originating web page, and to accept input of log information obtained from the web browser until an ending web page is reached.

For example, the log information input unit 11 receives, as an input, known benign data, and known malicious data. The known malicious data is data extracted from known malicious log information on facts that malware has been downloaded and attacks, such as personal information theft, have been performed from finally reached web pages. The known benign data is data extracted from known benign log information on facts that no attack has been performed across all the transitioning web pages.

Figure 4:
FIG. 4 shows an example of web page transition occurring when a web page is accessed using a web browser.

The log information is on a log that can be obtained from a web browser when web pages are accessed by the web browser. As shown in FIG. 4, a web page is accessed and a browser operation is performed, and resultantly transition is made to a new web page in some cases.

The log information obtained by the log information input unit 11 holds one or more web pages, and a sequence of transition of the web pages, and constitutes items shown in FIG. 5. FIG. 5 shows an example of items constituting the log information. Examples of items of the log information include screen shot images of web pages, HTML source code, and communication logs, browser operation logs, and browser event logs during transition of web pages by browser operations for web pages.

FIG. 6 shows an example of a communication log. The communication log is on communication occurring at web page reading and web page transition. At web page transition from a certain web page, a web page is instantaneously transferred by a command from a web server in some cases (web page redirect). When web page redirect occurs, the number of occurrences and communication destinations are obtained.

FIG. 7 shows an example of the browser operation log. The browser operation log is on browser operations that are causes of web page transition. Mouse left/right button clicks, browser back button clicks, mouse coordinates (X, Y) when clicked, sizes of click target HTML elements (height, width), and HTML tag types are extracted.

FIG. 8 shows an example of the browser event log. A browser event is an event of a browser caused by a browser operation. File download occurrences, alert dialog appearances, browser extension function installation screen appearances, pop up window appearances and the like are treated as browser events, and presence or absence of their occurrence, communication content, and message content are extracted.

The log information is recorded when a user manually operates the web browser in a certain case; the information is recorded by automatic control by a browser operation automatic tool or the like in another case. The log information can be obtained using a browser extension function installed on the web browser, a debug tool for a web browser developer or the like.

The image feature amount extraction unit 12 extracts, as the feature amount of each web page included in the log information, image data on the screen of the web page drawn by the web browser, and converts the image data into image information based on feature points and a color distribution. For example, the image feature amount extraction unit 12 extracts the image feature amount from a screen shot image of a web page included in the log information. FIG. 9 shows an example of image features. The image feature extraction method is not limited to the method described below. Any method capable of converting image data into vector information can be used instead. The number of dimensions of data shown in FIG. 9 may be freely set in a case of a method that can freely set the number of dimensions of data to be output.

A distribution data obtained by measuring the number of appearances (frequency) of pixels having a certain pixel value (light and dark) in a target image, with respect to each pixel value, is called a histogram. The image feature amount extraction unit 12 measures, for an image color histogram, a histogram of frequencies of 256-type pixel values with respect to red, green and blue of an input image, and extracts 256-dimensional data on a color-by-color basis.

The image feature amount extraction unit 12 analyzes images using a local feature amount extraction algorithm typified by ORB, KAZE and AKAZE. The local feature amount extraction algorithm is known as a method of recognizing an object in an image, and can convert image data into vector information having a freely selected dimension (the number of feature points) by detecting feature points residing in a certain image.

When the image feature amount extraction unit 12 converts images into vectors using the local feature amount extraction algorithm, multiple feature points used for detection are required to be preset. For example, screen shot images of multiple web pages are preliminarily collected, and feature points common to the images are extracted.

The document feature amount extraction unit 13 extracts character string information described on the web page as the feature amount of the web page, and converts the character string information into document information based on meaning of a document, a topic, and a word configuration.

For example, the document feature amount extraction unit 13 extracts, as document data, character strings that are to be actually displayed on a web page, from HTML source code of the web page included in the log information, and converts the document data into vector information. FIG. 10 shows an example of document features. The document feature extraction method is not limited to the method described below. Any method capable of converting document data into vector information can be used instead. The number of dimensions of data shown in FIG. 10 may be freely set in a case of a method that can freely set the number of dimensions of data to be output.

For example, to extract character strings to be displayed on a web page, the document feature amount extraction unit 13 removes HTML tag portions from HTML source code, and extracts the remaining character strings as document data. The method of extracting character strings to be displayed on a web page is not limited to the removal of the HTML tag portions. Any method can be used instead. The document feature amount extraction unit 13 uses an existing topic model method and statistical document processing method, as a method of converting the document data into vector information.

The topic model method, which is typified by Doc2Vec and Latent Dirichlet Allocation (LDA), is a method of estimating latent meaning of a document and converting character string data into vector information. The statistical document processing method, which is typified by bag-of-words and tf-idf, is a method of measuring the appearance frequency of words and converting the document into vector information.

To convert the document data extracted from the web page into vector information using the topic model method, the document feature amount extraction unit 13 requires preliminary creation of a learning model for conversion. For example, the document feature amount extraction unit 13 preliminarily collects document data extracted from multiple web pages, and creates the learning model using the document data.

To convert the document data extracted from the web page into vector information using the statistical document processing method, the document feature amount extraction unit 13 requires preliminary setting of words for conversion.

For example, the document feature amount extraction unit 13 preliminarily collects document data extracted from multiple web pages, extracts words from the document data, and sets them as words for conversion.

The structural feature amount extraction unit 14 extracts a source code file of each web page as the feature amount of the web page, and converts the source code file into HTML structure information based on the structure and statistical information. For example, the structural feature amount extraction unit 14 converts, into the vector information, the HTML source code of the web pages included in the log information.

FIG. 11 shows an example of structural features. The structural feature extraction method is not limited to the method described below. Any method capable of converting HTML source code into vector information can be used instead. The structural feature amount extraction unit 14 measures the number of appearances for each preset HTML tag from target HTML source code, as the number of HTML tag appearances. For example, the structural feature amount extraction unit 14 preliminarily extracts HTML source code from multiple web pages, preliminarily extracts HTML tags frequently appearing in the HTML source code, and sets the tags as HTML tags for measurement. The structural feature amount extraction unit 14 extracts the data size of the HTML source code, as the HTML source code data size.

The web browser operational feature amount extraction unit 15 extracts, as the feature amounts about the operation, information on operation content performed on the web browser on a path reaching the ending web page from the originating web page, and information at a target web page location where the operation has been performed.

For example, the web browser operational feature amount extraction unit 15 extracts the web browser operation log as vector information. An example in FIG. 12 is an example of the browser operation feature amount. For example, the web browser operational feature amount extraction unit 15 converts items of the browser operation log other than numerical value data, into numerical value data, using one-hot representation. For example, in a case where there are three types of tags including "a" tag, "div" tag and "iframe" tag as click target HTML and the "a" tag is actually clicked, the web browser operational feature amount extraction unit 15 sets the "a" tag to one while setting the remaining tags to zero.

The web browser event feature amount extraction unit 16 extracts, as the feature amount about the event, the event having occurred on the web browser on a path reaching the ending web page from the originating web page. The web browser event feature amount extraction unit 16 extracts the web browser event log and the communication log, as vector information. An example in FIG. 11 is an example of the web browser event feature amount. The number of occurrences and the number of appearances in the items of the browser event log and the communication log are measured.

The learning unit 17 generates a training model using, as training data, any one or more feature amounts among a feature amount of each web page, a feature amount about an operation performed on the web browser on a path reaching the ending web page, and a feature amount about an event occurring on the path reaching the ending web page. Specifically, the learning unit 17 generates a training model using, as training data, any one or more feature amounts among feature amounts extracted by the image feature amount extraction unit 12, the document feature amount extraction unit 13, the structural feature amount extraction unit 14, the web browser operational feature amount extraction unit 15 and the web browser event feature amount extraction unit 16.

For example, the learning unit 17 generates learning target data by integrating pieces of vector information on feature amounts extracted by the image feature amount extraction unit 12, the document feature amount extraction unit 13, the structural feature amount extraction unit 14, the web browser operational feature amount extraction unit 15 and the web browser event feature amount extraction unit 16, generates a training model using a supervised machine learning method capable of executing binary classification, and records the training model in the storage unit 18.

FIG. 14 shows an example of learning target data where the image feature amounts of web pages 1 to 3, the document feature amounts of web pages 1 to 3, the structural feature amounts of web pages 1 to 3, the browser operation feature amount between web pages 1 and 2, the browser operation feature amount between web pages 2 and 3, the browser event feature amount between web pages 1 and 2, and the browser event feature amount between web pages 2 and 3 are integrated. Note that the combination of feature amounts is not limited thereto. Any combination may be set according to the number of web page transitions in the input log information, and the supervised machine learning method to be applied.

Figures 15, 16:
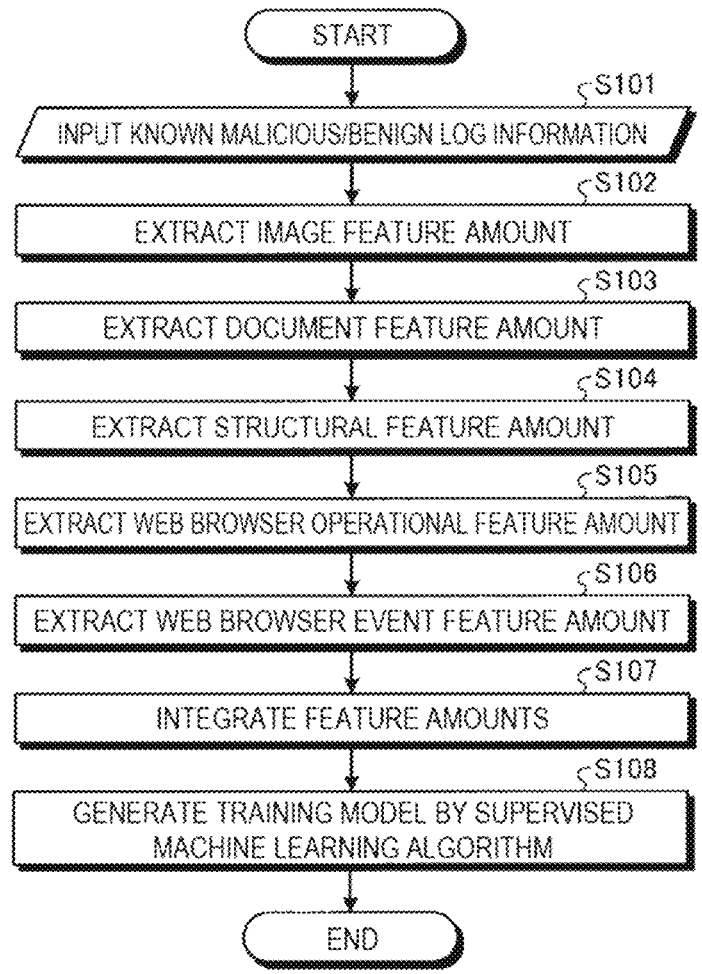
FIG. 15 shows an example of a determination result.
FIG. 16 shows a flowchart of a training model generating process.

FIG. 15 shows an example of a determination result according to the training model generated by the learning unit 17. In this example, determination target data extracted from log information including two web page transitions among three web pages is input into the training model, and is classified in a binary manner into malicious or benign ones.

The learning unit 17 may be a support vector machine and random forests, which are examples of supervised machine learning methods capable of executing binary classification. However, the unit is not limited thereto. As described above, the learning device 10 extracts the feature amounts from the known benign and malicious pieces of log information, creates the training data, and generates the training model using the supervised machine learning method.

The storage unit 18 is a storage device, such as an HDD (Hard Disk Drive), an SSD (Solid State Drive), and an optical disk. Note that the storage unit 18 may be a data-rewritable semiconductor memory, such as a RAM (Random Access Memory), a flash memory, or an NVSRAM (Non Volatile Static Random Access Memory). The storage unit 18 stores the training model generated by the learning unit 17.

Next, each unit of the determination device 20 is described. The log information input unit 21 uses a web browser to crawl one or more web pages from an originating web page, and to accept input of log information obtained from the web browser until an ending web page is reached. For example, the log information input unit 21 receives, as an input, log information that is on web page transitions by web browser operations and has been recorded when web pages are accessed by the web browser. The log information is on a log that can be obtained from a web browser when web pages are accessed by the web browser.

The image feature amount extraction unit 22, the document feature amount extraction unit 23, the structural feature amount extraction unit 24, the web browser operational feature amount extraction unit 25, and the web browser event feature amount extraction unit 26 in the determination device 20 perform processes similar to those of the image feature amount extraction unit 12, the document feature amount extraction unit 13, the structural feature amount extraction unit 14, the web browser operational feature amount extraction unit 15, and the web browser event feature amount extraction unit 16 in the learning device 10. Accordingly, description thereof is herein omitted.

The determination unit 27 inputs any one or more feature amounts among a feature amount of crawled web pages, a feature amount about an operation performed on the web browser on a path reaching the ending web page, and a feature amount about an event occurring on the path reaching the ending web page, as input data, into a pre-trained training model, and determines whether the ending web page is malicious according to an output result of the training model.

For example, the determination unit 27 generates determination target data by integrating pieces of vector information of a feature amount extracted by the image feature amount extraction unit 22, the document feature amount extraction unit 23, the structural feature amount extraction unit 24, the web browser operational feature amount extraction unit 25 and the web browser event feature amount extraction unit 26, and performs malicious determination using the training model in the storage unit 29.

FIG. 14 shows an example of determination target data where the image feature amounts of web pages 1 to 3, the document feature amounts of web pages 1 to 3, the structural feature amounts of web pages 1 to 3, the browser operation feature amount between web pages 1 and 2, the browser operation feature amount between web pages 2 and 3, the browser event feature amount between web pages 1 and 2, and the browser event feature amount between web pages 2 and 3 are integrated. Note that the combination of feature amounts is not limited thereto. Any combination may be set according to the number of web page transitions in the input log information, and the supervised machine learning method to be applied.

FIG. 15 shows the determination result according to the training model. In this example, the determination unit 27 inputs determination target data extracted from log information including two web page transitions among three web pages, into the training model, outputs a malicious or benign determination result, and determines whether the ending web page is malicious. As described above, the determination device 20 extracts the feature amounts from the determination target log information, generates test data, and performs determination using the trained training model.

The output unit 28 outputs the determination result determined by the determination unit 27. The storage unit 29 is a storage device, such as an HDD, an SSD, and an optical disk. Note that the storage unit 29 may be a data-rewritable semiconductor memory, such as an RAM, a flash memory, or an NVSRAM. The storage unit 29 stores the training model generated by the learning device 10.

[Processing procedures of learning process and determination process] Next, processing procedures of the learning process and the determination process according to the embodiment are described. FIG. 16 shows a flowchart of a training model generating process. FIG. 17 shows a flowchart of the determination process.

As exemplified in FIG. 16, the log information input unit 11 of the learning device 10 receives, as an input, known malicious/benign log information (step S101). The image feature amount extraction unit 12 then extracts the image feature amount from a screen shot image of a web page included in the log information (step S102).

Subsequently, the document feature amount extraction unit 13 extracts the meaning and structure of the document from character strings described in the web page, as the document feature amount (step S103). The structural feature amount extraction unit 14 then extracts the structural feature amount from the source code of the web page (step S104).

Subsequently, the web browser operational feature amount extraction unit 15 extracts the web browser operational feature amount that is the feature amount of information on operations performed for the web browser until the ending web page is reached (step S105). The web browser event feature amount extraction unit 16 then extracts the web browser event feature amount that is the feature amount of information on web browser events occurring until the web page is reached (step S106).

The learning unit 17 then integrates the feature amounts extracted by the image feature amount extraction unit 12, the document feature amount extraction unit 13, the structural feature amount extraction unit 14, the web browser operational feature amount extraction unit 15, and the web browser event feature amount extraction unit 16 (step S107). The learning unit 17 then generates the training model by the supervised machine learning algorithm (step S108).

As exemplified in FIG. 17, the log information input unit 21 of the determination device 20 receives, as an input, determination target log information (step S201). The image feature amount extraction unit 22 then extracts the image feature amount from a screen shot image of a web page included in the log information (step S202).

Subsequently, the document feature amount extraction unit 23 extracts the meaning and structure of the document from character strings described in the web page, as the document feature amount (step S203). The structural feature amount extraction unit 24 then extracts the structural feature amount from the source code of the web page (step S204).

Subsequently, the web browser operational feature amount extraction unit 25 extracts the web browser operational feature amount that is the feature amount of information on operations performed for the web browser until the ending web page is reached (step S205). The web browser event feature amount extraction unit 26 then extracts the web browser event feature amount that is the feature amount of information on web browser events occurring until the web page is reached (step S206).

The determination unit 27 then integrates the feature amounts extracted by the image feature amount extraction unit 22, the document feature amount extraction unit 23, the structural feature amount extraction unit 24, the web browser operational feature amount extraction unit 25, and the web browser event feature amount extraction unit 26 (step S207). The determination unit 27 then inputs the integrated data into the trained training model, thereby performing a process of determining whether the ending web page is malicious or not according to the training model (step S208).

[Effects of embodiment] As described above, the learning device 10 according to the embodiment uses the web browser to crawl one or more web pages from the originating web page, and to accept input of log information obtained until the ending web page is reached. The learning device 10 then generates a training model using, as training data, any one or more feature amounts among the feature amount of the crawled web pages, the feature amount about an operation performed on the web browser on a path reaching the ending web page, and the feature amount about an event occurring on the path reaching the ending web page.

The determination device 20 according to the embodiment uses the web browser to crawl one or more web pages from the originating web page, and to accept input of log information obtained from the web browser until the ending web page is reached. The determination device 20 inputs any one or more feature amounts among a feature amount of crawled web pages, a feature amount about an operation performed on the web browser on a path reaching the ending web page, and a feature amount about an event occurring on the path reaching the ending web page, as input data, into a pre-trained training model, and determines whether the ending web page is malicious according to an output result of the training model.

Thus, the determination system 1 according to the embodiment can use log information obtained when web pages are crawled through use of a web browser to allow a web page causing an SE attack to be accurately determined without any limitation due to individual attack types of SE attacks.

[System configuration etc.] Each configuration element of each device is a functional concept, and is not required to be physically configured as shown in the diagram. That is, the specific mode of distribution and integration of the devices is not limited to what is illustrated. The entire or a part of the mode can be functionally or physically distributed or integrated in freely selected configuration units to support various loads, use situations and the like, thus achieving the configuration. Furthermore, all or some of individual processing functions executed in the respective devices can be achieved by the CPU and a program analyzed and executed by the CPU, or can be achieved as hardware made of wired logics.

Among the processes described in this embodiment, all or some of processes described to be performed automatically may be performed manually. Additionally or alternatively, all or some of processes described to be performed manually may be performed automatically by a known method. Furthermore, the processing procedures, control procedures, specific names, and information including various data items and parameters illustrated in the aforementioned document and drawings can be freely changed if not otherwise specified.

[Program] FIG. 18 shows an example of a computer that executes a program to thereby achieve the learning device 10 or the determination device 20. The computer 1000 includes, for example, a memory 1010, and a CPU 1020. The computer 1000 includes a hard disk drive interface 1030, a disk drive interface 1040, a serial port interface 1050, a video adapter 1060, and a network interface 1070. These components are connected to each other via a bus 1080.

The memory 1010 includes a ROM (Read Only Memory) 1011, and a RAM 1012. The ROM 1011 stores, for example, a boot program, such as BIOS (Basic Input Output System). The hard disk drive interface 1030 is connected to a hard disk drive 1090. The disk drive interface 1040 is connected to a disk drive 1100. For example, a detachable storage medium, such as a magnetic disk or an optical disk, is inserted into the disk drive 1100. The serial port interface 1050 is connected to a mouse 1110 and a keyboard 1120, for example. The video adapter 1060 is connected to a display 1130, for example.

The hard disk drive 1090 stores, for example, an OS (Operating System) 1091, an application program 1092, a program module 1093, and program data 1094. That is, a program that defines each process of the learning device 10 or the determination device 20 is implemented as a program module 1093 in which code executable by a computer is described. The program module 1093 is stored in the hard disk drive 1090, for example. For example, the program module 1093 for executing processes similar to those of the functional configuration of the learning device 10 or the determination device 20 is stored in the hard disk drive 1090. Note that the hard disk drive 1090 may be replaced with an SSD (Solid State Drive).

The setting data used in the processes in the embodiment described above is stored, as the program data 1094, in the memory 1010 or the hard disk drive 1090, for example. The CPU 1020 then reads the program module 1093 or the program data 1094 stored in the memory 1010 or the hard disk drive 1090, into the RAM 1012 as required and executes them.

Note that the program module 1093 and the program data 1094 are not limited to those in the case of being stored in the hard disk drive 1090. Alternatively, for example, the module and data may be stored in a detachable storage medium, and read by the CPU 1020 through the disk drive 1100 or the like. Alternatively, the program module 1093 and the program data 1094 may be stored in another computer connected via a network (LAN, WAN (Wide Area Network), etc.). The program module 1093 and the program data 1094 may then be read by the CPU 1020 from the other computer via the network interface 1070.

The embodiment, to which the invention made by the present inventor is applied, has thus been described above. The present invention is not limited by the description and drawings constituting a part of the disclosure of the present invention through this embodiment. That is, other embodiments, examples, operation techniques and the like performed by those skilled in the art on the basis of this embodiment are entirely encompassed by the present invention.

REFERENCE SIGNS LIST

1 Determination system
10 Learning device
11, 21 Log information input unit
12, 22 Image feature amount extraction unit
13, 23 Document feature amount extraction unit
14, 24 Structural feature amount extraction unit
15, 25 Web browser operational feature amount extraction unit
16, 26 Web browser event feature amount extraction unit
17 Learning unit
18, 29 Storage unit
20 Determination device
27 Determination unit
28 Output unit

The invention claimed is:

1. A learning device comprising:
processing circuitry configured to:
  use a web browser to crawl one or more web pages from an originating web page, and to accept input of log information obtained from the web browser until an ending web page is reached; and
  generate a training model using, as training data, any one or more feature amounts among a feature amount of each web page included in the log information, a feature amount about an operation performed on the web browser on a path reaching the ending web page, and a feature amount about an event occurring on the path reaching the ending web page, the training data including data from known malicious log information and known benign log information, wherein
the known malicious log information corresponds to log information from traversal of a plurality of web pages in which malware download or information theft was performed,
the known benign log information corresponds to log information from traversal of a plurality of web pages in which no malicious attacks were performed,
the processing circuitry is further configured to extract, as the feature amount of each web page including in the log information, image data on a screen of a web page drawn by the web browser, and convert the image data into image information based on feature points and a color distribution, the color distribution including information on a number of pixels having a same predetermined value,
to extract the image data, the processing circuitry is configured to measure an image color histogram, and extract the image data on a color-by-color basis,
the image color histogram is a distribution data obtained by measuring a number of appearances of pixels having a certain pixel value in a target image, with respect to each pixel value, and
to convert the image data to image information, the processing circuitry is further configured to convert the image data into vector information having a dimension according to a number of the feature points by detecting the feature points residing in the image data.

2. The learning device according to claim 1, wherein the processing circuitry is further configured to extract, as the feature amount of each web page included in the log information, character string information described on the web page, and convert the character string information into document information based on meaning of a document, a topic, and a word configuration.

3. The learning device according to claim 2, wherein the processing circuitry is configured to use one of a Doc2Vec or a Latent Dirichlet Allocation (LDA) algorithm in conversion of the character string information to document information.

4. The learning device according to claim 1, wherein the processing circuitry is further configured to extract a source code file of the web page as the feature amount of each web page included in the log information, and convert the source code file into HTML structure information based on a structure and statistical information.

5. The learning device according to claim 1, wherein the processing circuitry is further configured to extract, as the feature amount about the operation, information on operation content performed on the web browser on a path reaching the ending web page from the originating web page, and information at a target web page location where the operation has been performed.

6. The learning device according to claim 5, wherein information on operation content performed on the web browser includes mouse left/right button clicks, browser back button clicks, mouse coordinates when the mouse left/right button is clicked, sizes of click target HTML elements, and HTML tag types.

7. The learning device according to claim 1, wherein the processing circuitry is further configured to extract, as the feature amount about the event, the event having occurred on the web browser on a path reaching the ending web page from the originating web page.

8. The learning device according to claim 1, wherein the event includes file down load occurrences, alert dialog appearances, browser extension function installation screen appearances, and pop up window appearances.

9. The learning device according to claim 1, wherein pixel values in the image color histogram include 256-type values with respect to red, green, and blue.

10. The learning device according to claim 1, wherein the processing circuitry is configured to extract the feature amount using a feature amount extraction algorithm including ORB, KAZE, and AKAZE.

11. A learning method executed by a learning device, comprising:
using a web browser to crawl one or more web pages from an originating web page, and to accept input of log information obtained from the web browser until an ending web page is reached; and
generating a training model using, as training data, any one or more feature amounts among a feature amount of each web page included in the log information, a feature amount about an operation performed on the web browser on a path reaching the ending web page, and a feature amount about an event occurring on the path reaching the ending web page, the training data including data from known malicious log information and known benign log information,
wherein
the known malicious log information corresponds to log information from traversal of a plurality of web pages in which malware download or information theft was performed,
the known benign log information corresponds to log information from traversal of a plurality of web pages in which no malicious attacks were performed,
the learning method including extracting, as the feature amount of each web page included in the log information, image data on a screen of a web page drawn by the web browser, and converting the image data into image information based on feature points and a color distribution, the color distribution including information on a number of pixels having a same predetermined value,
the extracting includes measuring an image color histogram, and extracting the image data on a color-by-color basis,
the image color histogram is a distribution obtained by measuring a number of appearances of pixels having a certain pixel value in a target image, with respect to each pixel value, and
the converting includes converting the image data into vector information having a dimension according to a number of the feature points by detecting the feature points residing in the image data.

12. A non-transitory computer-readable recording medium storing therein a learning program that causes a computer to execute a process comprising:
using a web browser to crawl one or more web pages from an originating web page, and to accept input of log information obtained until an ending web page is reached; and
generating a training model using, as training data, any one or more feature amounts among a feature amount of each web page included in the log information, a feature amount about an operation performed on the web browser on a path reaching the ending web page, and a feature amount about an event occurring on the path reaching the ending web page, the training data including data from known malicious log information and known benign log information,
wherein the known malicious log information corresponds to log information from traversal of a plurality of web pages in which malware download or information theft was performed, and the known benign log information corresponds to log information from traversal of a plurality of web pages in which no malicious attacks were performed, the learning method including extracting, as the feature amount of each web page included in the log information, image data on a screen of a web page drawn by the web browser, and converting the image data into image information based on feature points and a color distribution, the color distribution including information on a number of pixels having a same predetermined value, the extracting includes measuring an image color histogram, and extracting the image data on a color-by-color basis, the image color histogram is a distribution obtained by measuring a number of appearances of pixels having a certain pixel value in a target image, with respect to each pixel value, and the converting includes converting the image data into vector information having a dimension according to a number of the feature points by detecting the feature points residing in the image data.

\* \* \* \* \*